Feb. 26, 1935.  O. C. SCHMIDT  1,992,890
LIQUID CIRCULATING MEANS
Filed April 26, 1933  3 Sheets-Sheet 1
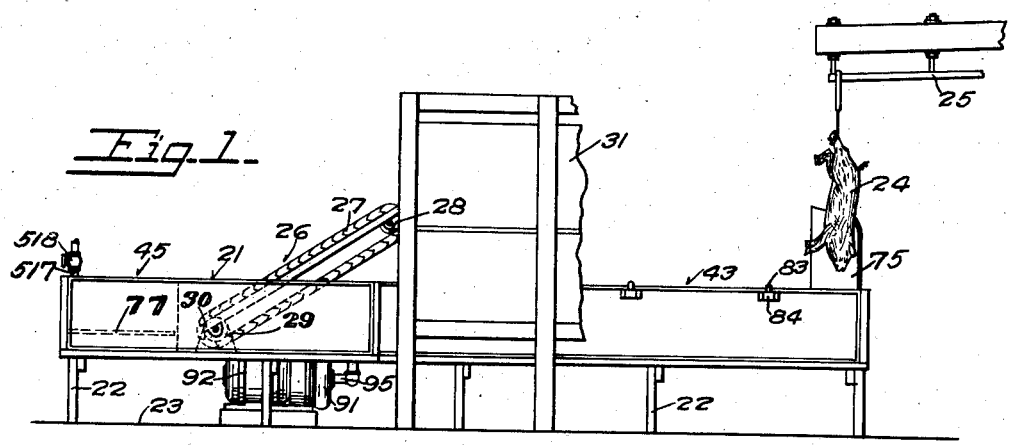
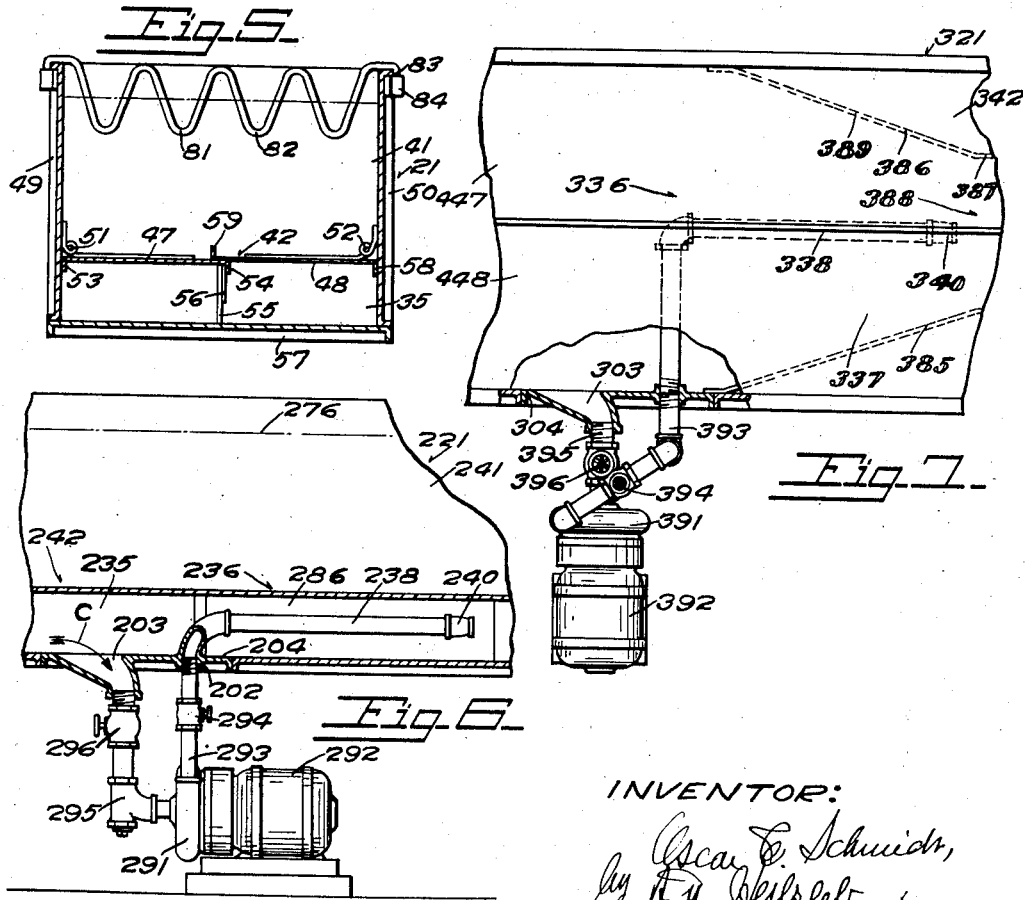
INVENTOR:
Oscar C. Schmidt,
By H. V. Weilsleb
His Attorney.

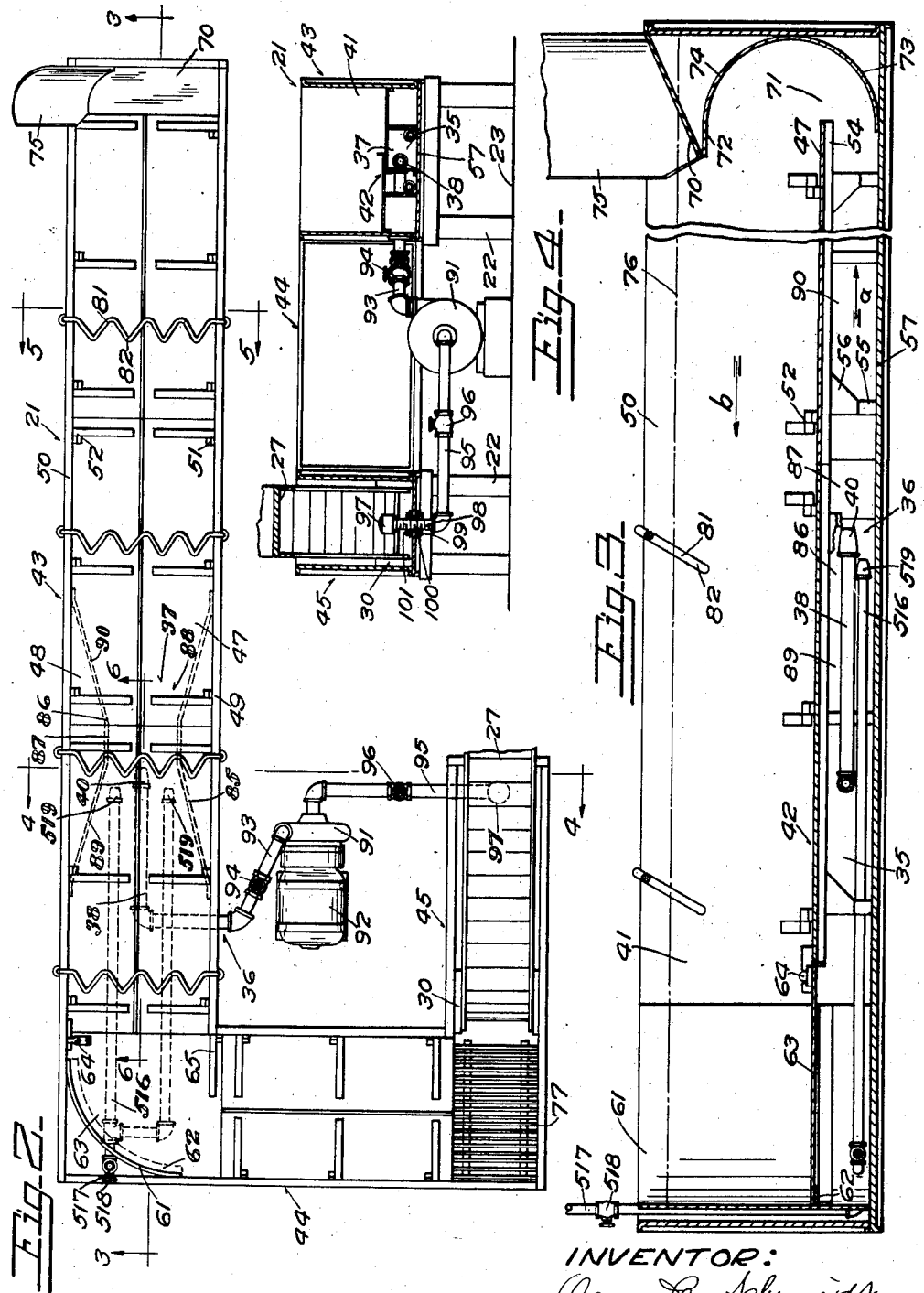

Feb. 26, 1935. O. C. SCHMIDT 1,992,890
LIQUID CIRCULATING MEANS
Filed April 26, 1933 3 Sheets-Sheet 3
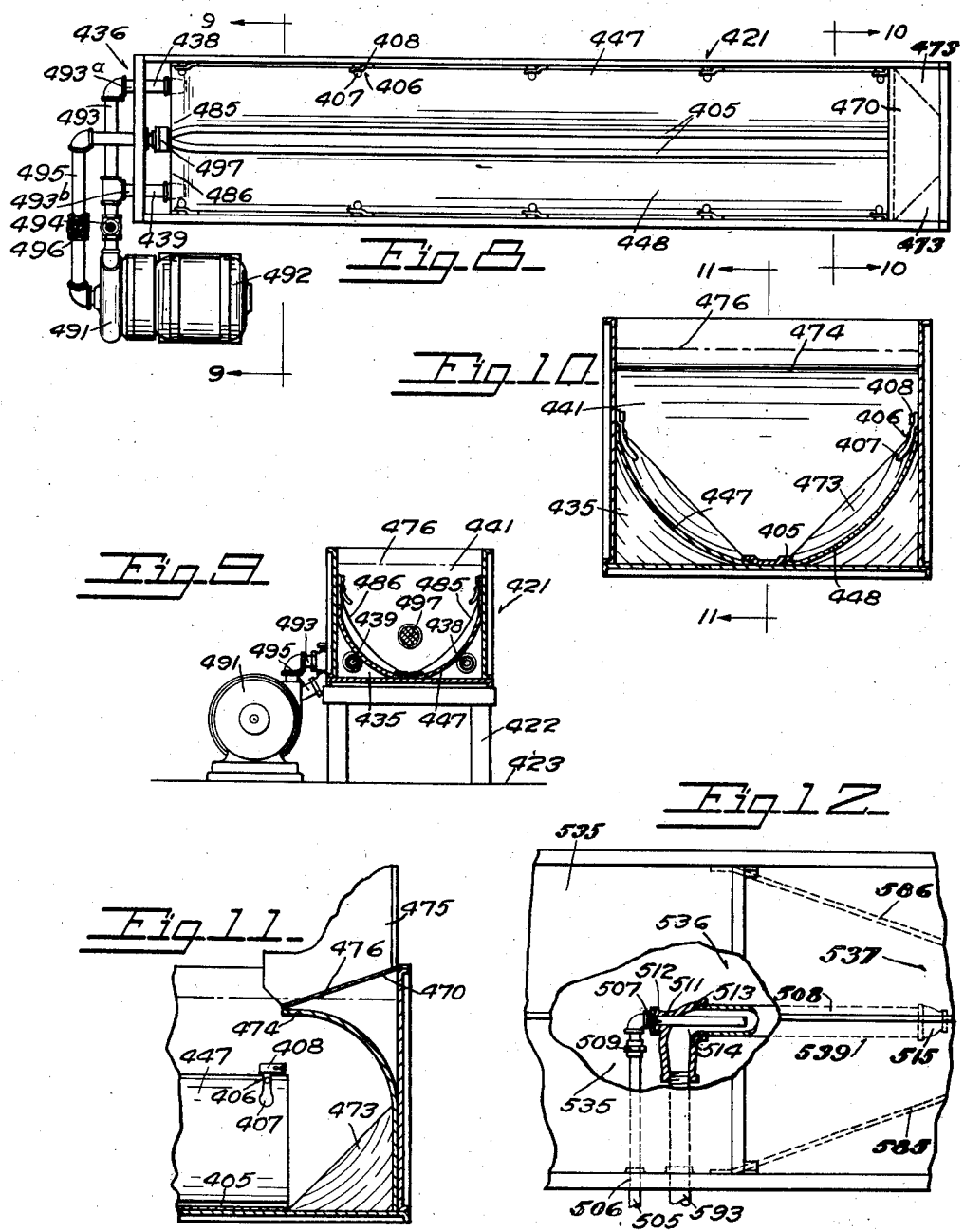

Patented Feb. 26, 1935

1,992,890

UNITED STATES PATENT OFFICE 1,992,890

LIQUID-CIRCULATING MEANS

Oscar C. Schmidt, Cincinnati, Ohio, assignor to The Cincinnati Butchers' Supply Company, Cincinnati, Ohio, a corporation of Ohio Application April 26, 1933, Serial No. 668,026

12 Claims. (Cl. 17—15)

My invention relates to liquid circulating means, and is applicable in various relations, for instance, in swimming tanks, for creating a flow or current of water in which the swimmer swims; in testing tanks for testing the speed of boats, and in other relations.

My invention relates particularly, however, to so-called scalding tanks in the slaughtering industry, in which slaughtered animals are scalded for preparing the same for ready removal of their bristles and hair, and for cleaning the same.

It is the object of my invention to provide for increased flow of the liquid, and to provide a float passage or chamber in which the liquid is caused to move with sufficient speed to float the carcasses to the point of use, whereby the pushing and the poling of the floating carcasses are largely avoided or dispensed with; and, further, to provide a plurality of passages communicating with each other and provided with means for accelerating the flow of liquid therein.

It is the object of my invention, further, to provide novel means for causing circulation of the liquid; further, to provide novel means whereby the liquid is divided into a plurality of channels or passages of relatively increasing cross-section; and, further, to provide accelerating means for the liquid in the channel of least cross-section, communicated progressively to the liquid in the channels of greater cross-section, whereby to cause accelerated flow in a float passage.

It is the object of my invention, further, to provide a tank with a partition to divide the tank into a liquid feed passage and a liquid float passage, and accelerating means for the liquid in the feed passage; further, to provide the feed passage with a cross-sectionally contracted portion and an injector in association therewith for accelerating the flow of the liquid through said contracted portion; further, to feed said injector from the liquid in the tank for enhancing circulation therein; and, further, to make said partition movable for inspection of parts covered thereby and for cleaning purposes.

It is the object of my invention, further, to provide steam injecting means so related as to cause acceleration of flow of the liquid and to heat the liquid; and, further, to provide steam injecting means in association with the liquid fed under pressure into the tank.

It has been the usual practice in using scalding tanks in the slaughtering industry, to push or pole the carcass along the tank, and to duck the carcass entirely under the surface of the water, by means of poles, until the conveyor is reached for lifting the carcass out of the tank. This has been time consuming and expensive. Difficulty has also been experienced in maintaining the liquid in the tank at uniform temperature.

It is the object of my invention, further, to overcome these objections and to provide a device in which the hog is caused to move automatically along the tank by circulating the water in the tank so that the flow of the water containing the carcass is sufficiently great to subject the carcass to the scalding action for the proper length of time in its floating movement to the conveyor, and to cause the bath to be of uniform temperature throughout.

In the drawings:

Fig. 1 represents a side elevation of my improved device, partly broken away.

Fig. 2 is a plan view of the same, partly broken away.

Fig. 3 is a vertical longitudinal section of the same, taken on the line 3—3 of Fig. 2, and partly broken away.

Fig. 4 is a vertical cross-section of the same, taken on the line 4—4 of Fig. 2.

Fig. 5 is a vertical cross-section of the same, taken on the line 5—5 of Fig. 2.

Fig. 6 is a vertical longitudinal section of my improved device, showing a modification of the pump connections, and taken in a plane corresponding to the plane of 6—6 of Fig. 2.

Fig. 7 is a plan view showing another modification of the same, partly broken away and partly in horizontal section.

Fig. 8 is a plan view showing a further modification of my improved device.

Fig. 9 is a vertical cross-section of the same, taken on the line 9—9 of Fig. 8.

Fig. 10 is a vertical cross-section of the same, taken on the line 10—10 of Fig. 8.

Fig. 11 is a longitudinal sectional detail of the same, taken on the line 11—11 of Fig. 10; and, Fig. 12 is a horizontal section of my improved device showing a further modification in which steam is injected into the liquid feed passage.

In the exemplification of my invention shown in the drawings, there is a tank 21 in the form of a scalding tank such as used in the slaughtering industry. It is usually supported on posts 22 for raising the same off the floor 23. The slaughtered animal, exemplified as a hog 24, is in practice dropped into one end of the tank off of a usual bleeding rail 25. The hog is scalded in the tank to loosen the bristles and the hair and the dirt and scurf thereon, and is at the other end of the tank delivered to an elevator 26, usually in the form of an endless conveyor 27 looped about pulleys 28, 29, and supported at its lower end in the tank on blocks 30. The carcass is lifted by the conveyor from the tank into a usual dehairing machine 31.

In my improved device, there is a passage 35 for the liquid which has accelerating means 36 for the liquid in connection therewith, exemplified as a contracted passage 37, forming a Venturi-like passage, which has an injector 38 in association therewith. The injector has a nozzle 40 which may be a reducing nozzle. The passage 35 may be termed the feed passage. A float passage 41 is also provided. The respective ends of the passage 35 communicate with the respective ends of the passage 41. The flow of liquid in the respective passages is in reverse directions.

In the exemplification shown in Figs. 1 to 5, the division between the passages is a horizontal partition 42, which is preferably movable for exposure of the parts covered thereby for inspection and cleaning purposes.

The tank is exemplified in Figs. 1 to 5 as comprising sections 43, 44 and 45 in angular relation with each other, and the partition is exemplified as extending throughout substantially the length of the sections 43 and 44, the section 45 being a comparatively quiet zone of liquid into which the elevator dips.

The partitions are exemplified as substantially horizontally disposed, and composed of sections lengthwise of the tank and also crosswise of the tank.

The sections 47, 48 of the partitions are hinged at their outer margins to the respective side walls 49, 50, of the tank by means of hinges 51, 52, the butts whereof are secured respectively to the side walls of the tank and to the sections of the partition.

The walls and bottom of the tank may be of cast iron or of other material. The partitions are preferably bent up out of sheet metal.

The section 47 of the partition is provided with an outer depending flange 53 and an inner depending flange 54. (Figs. 3 and 5). Legs 55 are secured to the inner margin of the section 47 by means of brackets 56, riveted respectively to the legs and the flange 54. The legs rest on the floor 57 of the tank.

The sections 48 of the partition are respectively provided with outer downwardly bent flanges 58 and with inner upwardly bent flanges 59. The inner ends of the sections 48 rest on the inner margins of the sections 47.

A deflector 61 (Figs. 2 and 3) is located in the angle between the sections 43 and 44 of the tank. This is an upright deflector extending upwardly from the bottom of the tank throughout the heights of the passages 35 and 41, and is arcuate in horizontal plane for deflecting the liquid in the passages, causing ready flow between the angularly related sections of the tank, and preventing swirling and bubbling of the fluid at said angle.

This deflector is provided with a supporting flange 62, which forms a rest for the partition section 63 at said angle. This partition section has straight edges at two of its margins for matching the partitions in the respective sections 43, 44 of the trough or tank, and an arcuate edge to match the deflector 61. It is hinged on hinges 64, 65, at one of its straight edges to opposite upright walls of the tank.

The sections of the partitions preferably form intimate contact with each other and with the side walls of the tank and the deflector, for dividing the feed channel from the float channel and preventing cross currents between the same intermediate of the lengths of the partitions.

One of the ends of the passages have communication with each other, as shown by the space 71. The liquid moves in the direction of the arrow $a$ in the passage 35 and in the direction of the arrow $b$ in the passage 41, these movements being in opposite directions in the respective passages. In order to facilitate the change in direction of the liquid, a deflector 72 is provided between their ends. This deflector preferably extends throughout the width of the tank and has a lower arcuate section 73 for changing the direction of the liquid from the feed passage 35 upwardly, and an upper arcuate section 74 for directing the liquid to move horizontally in reverse direction, this deflector having its hollow presented towards the ends of the passages.

The hog receiving end of the tank is provided with a chute 75 proximate to a deflector 70 above the deflector 72, for directing the hog into the tank.

There is a body of liquid passing through the feed passage 35 and a body of liquid passing through the float passage or chamber 41. The level of the body of liquid is exemplified at 76. The upper end of the deflector 72 is preferably below this level. This aids in preventing ebullition and foaming of the liquid and aids in providing change of direction of the liquid in the form of a continuously flowing body.

At the opposite end of the tank there is preferably a grating 77, preferably on a level with the partition. The liquid in the float chamber or passage moves toward the grating and at the end of the partition passes through the grating into the feed passage 35 under the partition. The grating arrests the carcass. The body of liquid beyond the partition forms a quiet zone of liquid which is out of the path of the current in the liquid, but which stabilizes said current and acts as a cushion for equalizing the level of the body of liquid. The carcass is floated and directed, as by poling, from this quiet zone on to the discharge means, instanced as the conveyor, for discharging the carcass from the tank.

The hogs usually float in the float channel or chamber. At suitable points along the channel means, herein termed duckers, are provided, for immersing or submerging the hogs. These are shown as bent rods 81, bent to form depending arms 82, reaching below the surface of the liquid in the tank and preferably slanted downwardly and rearwardly. They are provided with downwardly bent end prongs 83, received in sockets 84, fixed to the side walls of the tank. A suitable number of the duckers may be provided along the tank. When a hog contacts a ducker the hog is automatically submerged. The hog begins automatically rising to the surface when it has passed the ducker, and encounters successive duckers for successively ducking the hogs. The round body of the hog contacts the rearwardly sloping downwardly projecting arms of the duckers for readily automatically submerging the hog, aided by the current in the float chamber.

Means are provided in one of the passages for accelerating the flow in the passages, so as to accelerate the flow in the float passage. The means exemplified include the Venturi-like passage 37, shown as part of the feed passage, comprising deflectors 85, 86, shown as plates whose respective ends are secured to the respective side walls of the passage 35, and which have an intermediate inwardly extending portion 87, forming a throat 88, rear slanting portions 89, slanting from the side walls of the tank towards the throat and forward spreading portions 90, sloping from the throat toward said side walls, the side walls of the throat formed by short flat portions of said plates. These plates extend throughout the height of the passage 35. These side walls form a flaring mouth or contracting portion of the liquid passage.

The injector 38 injects a forceful stream into a passage in the direction of intended flow of the liquid and moving with it the adjacent liquid in said passage for causing substantially rapid movement of the entire body of liquid in the passage. The injector is shown as coacting with the Venturi-like passage.

The injector is preferably fed by liquid from the body of liquid in the tank. This is shown accomplished by means of a pump 91, driven by an electric motor 92, shown as a combined machine. A feed pipe 93 extends from the outlet port of the pump, and has connection with the injector, a valve 94 being located in this pipe. The inlet port of the pump has a suction pipe 95 connecting therewith, in which there is a valve 96. The suction pipe may receive its supply of liquid from any part of the tank, preferably in rear of the injector.

In Figs. 2 and 4 the suction end of the suction pipe has a sieve 97 thereover. This suction end is in the form of a nipple 98 which passes through a hole 99 in the bottom of the tank. The connection between the suction pipe and the tank is sealed against leakage, as by a suitable packing 100 in a suitable gland 101, threaded to the nipple at each end of said hole.

In Fig. 6 the supply is through an opening 202 in the bottom of the tank, and the suction pipe has connection with a suction opening 203, which slopes and spreads toward the rear of the tank for readily directing the flow of liquid, as indicated by the arrow c, into said suction opening toward the pump, and forming a wide mouth into which the liquid moves readily. In this figure the corresponding parts are designated by similar numerals raised to the series 200.

The openings are in a plate 204, which becomes part of the bottom wall of the tank, a portion of the supply pipe being shown formed on said plate.

In Fig. 7, the feed pipe and suction pipe are shown connected in similar manner with the side wall of the tank, the parts being designated by similar numerals raised to the series 300.

In a further modification shown in Figs. 8, 9, 10 and 11, similar parts are designated by similar numerals raised to the series 400. In this modification a straight tank is shown, and the feed passage is divided, forming two passages at the respective lower side angles of the tank. These passages are formed by partitions 447, 448, movably secured in the tank as by having their lower edges received under flanges 405 secured to the bottom of the tank and extending outwardly with relation to each other, these flanges extending lengthwise of the tank preferably throughout the length of the partitions. The upper edges of the partitions are provided with latches 406 pivoted to the upper margins of said partitions, and having handles 407, the latching lugs of the latches being received under keepers 408, secured to the side walls of the tank. A suitable number of these latches is provided for each of the upper margins of the partitions. When the latches are released the handles may be employed for raising the partitions, the lower edges of the partitions slipping from under the flanges 405, for access to the lower angles of the tank for attention and cleaning purposes. The partitions are readily replaced.

The rear ends of the partitions are provided with inwardly flaring portions 485, 486, forming deflectors, slanting toward said passages and forming Venturi-like portions of said passages with which injectors 438, 439, coact for causing rapid flow of liquid in said passages.

The other end of the tank is provided with concaved deflectors 473, at the lower corners of the tank, for deflecting the liquid from the respective passages 435 inwardly and upwardly, an upper deflector 474 being also provided for directing the liquid in reverse direction lengthwise of the float channel. This upper deflector is curved inwardly and toward the length of the channel, its upper end being preferably under the level of the liquid in the tank, so as to change the course of the liquid with little agitation of the liquid and avoiding cross currents, ebullition, bubbling and saponifying action.

In this modification the injectors are supplied from a feed pipe 493, having branches 493a, 493b, extending through openings in the rear wall of the tank and liquid sealed therein. The suction pipe for the pump 491 is received through an opening in the rear wall of the tank wherein it is liquid sealed, and extends into the float passage, the suction end of the pipe being provided with a sieve 497.

If desired, the liquid in the tank may be heated by steam injected preferably in the direction of flow of the liquid in each form shown, the force of the steam aiding in causing acceleration of flow of the liquid. Fig. 12 exemplifies such a means in which the steam is injected into the feed pipe supplied by the pump. The parts are designated by similar reference numerals raised to the series 500.

A steam pipe 505 is received through an opening 506 in the wall of the tank and is liquid sealed therein. A section 507 thereof in the section 508 of the liquid feed pipe extends parallel with the passage 535. The steam pipe 505 has a coupling 509 therein. The section 507 of the steam pipe passes through a hole 511 in the heel 512 of a fitting 513. This fitting has a bore 514 of greater diameter than the diameter of the bore of the feed pipe 593 in rear thereof. The section 508 of the feed pipe, also of greater diameter, connects with the discharge end of said fitting.

The section 507 of the steam pipe extends into and is spaced from said last-named section 508, which latter is provided with a reducing nozzle 515, through which the mixed steam and liquid is projected with force, for heating and accelerating the liquid and injecting it with great force and greater volume into the Venturi-like passage for increasing the speed and volume of flow of the liquid through the Venturi-like passage and simultaneously heating the same. The heat and accelerated flow of the liquid is evenly distributed throughout the feed passage in the tank and throughout the float passage therein.

Referring to Figs. 1, 2 and 3, the steam may be admitted through a branch or branches 516 of a steam supply pipe 517 having a valve 518 therein, and provided with nozzles 519. The steam supply pipe injects steam into the Venturi-like passage adjacent to the liquid injector 38, for accelerating and increasing the flow of liquid in the feed passage and in the float passage and uniformly heating the liquid therein.

The steam pipes are preferably so positioned as to be outside of the path of travel of the carcasses, so that the carcasses will not come in contact therewith, being shown located in the feed passage or shielded by deflectors.

My improved device is very efficient and enables a large volume of liquid to be moved with comparatively little power. Instancing a tank such as shown in Figs. 1 to 5 inclusive, as having a bath or liquid contents capacity of approximately 7250 gallons, a current may be readily obtained in the float passage of approximately 60 feet per minute to cause a hog to travel approximately 53 feet per minute, by means of a pump having a pumping capacity of approximately 300 gallons per minute. Assuming a feed pipe leading from the pump of three inches diameter and a suction pipe leading to the pump of four inches diameter, a forceful stream of water is injected by means of the injector proximate to the contracted passage, which creates flow in all the adjacent liquid in the feed liquid passage for accelerating said liquid through said passage into the body of liquid in the float passage and causing all adjacent liquid in the latter to move with said injected body of liquid for causing substantial current in the float passage.

A portion of the latter liquid is removed through the suction pipe, causing suction movement in the body of float liquid in the direction of flow of the liquid, and again injecting said sucked liquid through the injector in the direction of flow of the feed liquid, causes circulation of the liquid.

I prefer that the partition shall be so placed that approximately one-third the body of liquid is in the feed passage and two-thirds in the float passage.

By means of my improved device, in the proportions above stated, I am enabled to move 3,000 gallons of water per minute in the float passage. These instances are given as examples and not as limitations.

By means of my improved device the automatic travel of the carcass is controlled by the speed imparted to the body of liquid, this speed being controlled by the controlled speed of the pump, or the capacity of the pump. The carcasses are automatically ducked in their travel along the float passage, the floating of the carcasses is readily controlled, and the delivery of carcasses at the elevator is readily regulated so as to insure a supply of carcasses for the elevator without danger of crowding the carcasses at the elevator, and sufficient uniform heating of the body of liquid to proper temperature is insured, and greater loosening of the bristles, hair and scurf is obtained.

I claim:

1. In liquid circulating means, the combination of a relatively larger passage, a relatively smaller passage whose respective ends communicate with said relatively larger passage, liquid-deflecting means for said relatively smaller passage forming a constricting passage, liquid-accelerating means accelerating liquid in said smaller passage at approximately said deflecting means and discharging liquid into said constricting passage and spaced cross-sectionally from the walls of said constricting passage for inducing accelerated flow of liquid through the space thus formed, and liquid deflecting means between proximate ends of said passages for deflecting liquid from said relatively smaller passage to said relatively larger passage, the discharge end of said last-named liquid deflecting means being located substantially wholly under the level of the liquid.

2. In liquid circulating means, the combination of a relatively larger passage for the main body of liquid and means for accelerating the flow of liquid in said larger passage comprising a relatively smaller passage having communication at its respective ends with said relatively larger passage and provided with a flaring portion, liquid accelerating means injecting liquid at relatively high speed and small cross-section into said relatively smaller passage at substantially said flaring portion for accelerating the flow and increasing the volume of liquid passing through said flaring portion, whereby to accelerate the flow and increase the volume of liquid passing through the portion of said relatively smaller passage in advance of said flaring portion, which in turn accelerates the flow and increases the volume of liquid passing through said relatively larger passage, and liquid deflecting means between the feed-out end of said relatively smaller passage and the feed-in end of said relatively larger passage, the discharge end of said liquid deflecting means being located substantially wholly under the level of the liquid.

3. In liquid circulating means, the combination of a tank to contain a body of liquid serving to float objects, a passage for liquid whose respective ends are in communication with said body of liquid, liquid accelerating means opening into said passage, arranged to cause flow in said body of liquid and movement of said floating objects in said tank toward one end of said tank, and ducking means acting on said floating objects to duck said floating objects into said flowing body of liquid, the point of communication between said passage and said body of liquid adjacent said last-named end being spaced from the end of said tank to form a comparatively quiet zone at said last-named end of said tank, and discharging means for said floating objects at said comparatively quiet zone.

4. In liquid circulating means, the combination of a tank to contain a body of liquid, a passage for liquid, one of the ends of said passage communicating with said body of liquid adjacent one end of said tank, and the other end of said passage communicating with said body of liquid distanced from the other end of said tank, and injecting means opening into said passage for causing flow of liquid in said passage and flow in said body of liquid between said points of communication and a comparatively quiet zone in said body of liquid between said other end of said tank and said point of communication of said other end of said passage with said body of liquid.

5. In liquid circulating means, the combination of a tank to contain a body of liquid, a passage for liquid, one of the ends of said passage communicating with said body of liquid adjacent one end of said tank, and the other end of said passage communicating with said body of liquid distanced from the other end of said tank, injecting means opening into said passage for causing flow of liquid in said passage and flow in said body of liquid between said points of communication and a comparatively quiet zone in said body of liquid between said other end of said tank and said point of communication of said other end of said passage with said body of liquid, and a grating between said body of liquid and said last-named point of communication.

6. In liquid circulating means, the combination of a tank, a partition therein dividing the tank into a lower liquid passage and an upper liquid float chamber, the respective ends of said lower passage having communication with said float chamber, said lower passage including a Venturi-like passage, liquid accelerating means having a discharge mouth coacting with and spaced cross-sectionally from the walls of said last-named passage to induce accelerated flow of liquid through said space and for causing flow in a given direction in said lower liquid passage, and deflecting means between the discharge end of said first-named passage and the proximate end of said float chamber for reversing the flow of liquid between said liquid passage and said float chamber, the discharge end of said deflecting means being located substantially wholly under the level of the liquid.

7. In liquid circulating means, the combination of a tank comprising angularly arranged sections, an arcuate deflector in the angle between sections, a partition in said tank dividing said tank into a lower liquid passage and an upper liquid channel, said partition comprising hinged sections, including a section having a straight edge and an arcuate edge, said arcuate edge being complementary to said arcuate deflector, said last-named section being hinged at said straight edge, said liquid passage including a Venturi-like portion, an injector co-operating therewith, and a pump feeding said injector and having suction communication with said liquid.

8. In liquid circulating means, the combination of a tank, a horizontally disposed partition in said tank dividing said tank into a lower liquid passage and an upper liquid channel, the respective ends of said liquid passage having communication with said liquid channel, a liquid deflector between one of the ends of said passage and said channel arranged for reversing the flow of liquid between said passage and said channel, said passage including a Venturi-like portion, an injector co-operating therewith, a pump for feeding said injector having suction communication with the liquid in said tank, and a grating between the other of the ends of said passage and said channel, and said tank extending beyond said grating and said other end of said liquid passage for forming a quiet liquid zone in said tank.

9. In liquid circulating means, the combination of a tank to contain a body of liquid, a passage for liquid, one of the ends of said passage communicating with said body of liquid adjacent one end of said tank, and the other end of said passage communicating with said body of liquid distanced from the other end of said tank, and liquid accelerating means opening into said passage for causing flow of liquid in said passage and flow in said body of liquid between said points of communication and a comparatively quiet zone in said body of liquid between said other end of said tank and said point of communication of said other end of said passage with said body of liquid.

10. In liquid circulating means, the combination of a tank to contain a body of liquid to float objects, a passage for liquid, one of the ends of said passage communicating with said body of liquid adjacent one end of said tank, and the other end of said passage communicating with said body of liquid distanced from the other end of said tank, liquid accelerating means opening into said passage for causing flow of liquid in said passage and flow in said body of liquid between said points of communication and a comparatively quiet zone in said body of liquid between said other end of said tank and said point of communication of said other end of said passage with said body of liquid, and discharging means for the objects at said comparatively quiet zone.

11. In liquid circulating means, the combination of a tank to contain a body of liquid, a passage for liquid, one of the ends of said passage communicating with said body of liquid adjacent one end of said tank, and the other end of said passage communicating with said body of liquid distanced from the other end of said tank, liquid accelerating means opening into said passage for causing flow of liquid in said passage and flow in said body of liquid between said points of communication and a comparatively quiet zone in said body of liquid between said other end of said tank and said second-named point of communication, and a grating between said other end of said passage and said body of liquid.

12. In liquid circulating means, the combination of a relatively larger horizontal passage, a relatively smaller horizontal passage whose respective ends communicate with said relatively larger passage, said relatively smaller passage including a cross-sectionally narrowing portion, liquid accelerating means having a discharge mouth cross-sectionally spaced from the wall of said narrowing portion for inducing accelerated flow between said mouth and said wall of said narrowing portion, and liquid deflecting means between the feed-out end of said relatively smaller horizontal passage and the feed-in end of said relatively larger horizontal passage, the feed-out end of said liquid deflecting means being located substantially wholly under the level of liquid in said relatively larger passage.

OSCAR C. SCHMIDT.